US012737535B2

(12) United States Patent
Feng

(10) Patent No.: US 12,737,535 B2
(45) Date of Patent: Sep. 15, 2026

(54) COMMENT PROCESSING METHOD INVOLVING DISPLAYING PREVIEW OF COMMENT CONTENT IN INSTANT MESSAGING CHAT, ELECTRONIC DEVICE, AND STORAGE MEDIUM

(71) Applicant: Beijing Zitiao Network Technology Co., Ltd., Beijing (CN)

(72) Inventor: Zifeng Feng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/094,622

(22) Filed: Mar. 28, 2025

(65) Prior Publication Data

US 2025/0225317 A1 Jul. 10, 2025

Related U.S. Application Data

(63) Continuation of application No. PCT/CN2023/138166, filed on Dec. 12, 2023.

(30) Foreign Application Priority Data

Jan. 30, 2023 (CN) ........................ 202310097817.4

(51) Int. Cl.

| | |
|---|---|
| ***G06F 40/169*** | (2020.01) |
| ***G06F 40/134*** | (2020.01) |
| ***H04L 51/046*** | (2022.01) |
| ***H04L 51/18*** | (2022.01) |

(52) U.S. Cl.

CPC .......... *G06F 40/169* (2020.01); *G06F 40/134* (2020.01); *H04L 51/046* (2013.01); *H04L 51/18* (2013.01)

(58) Field of Classification Search

CPC ............................ G06F 40/169; G06F 40/134

See application file for complete search history.

(56) References Cited

U.S. PATENT DOCUMENTS 8,996,985 B1 * 3/2015 Johnston ............... G06F 40/169
715/230
9,137,185 B2 * 9/2015 Costenaro ........... H04L 67/5683
9,747,268 B2 * 8/2017 Meisels ................. G06F 40/169

(Continued)

FOREIGN PATENT DOCUMENTS

CN 107820131 A 3/2018
CN 110472021 A 11/2019

(Continued)

OTHER PUBLICATIONS

International Search Report and Written Opinion for International Application No. PCT/CN2023/138166, mailed on Feb. 23, 2024, 14 pages.

(Continued)

*Primary Examiner* — Asher D Kells
(74) *Attorney, Agent, or Firm* — Astute IP Law Group

(57) ABSTRACT

A comment processing method, an electronic device, and a storage medium are provided. The comment processing method includes: obtaining comment content in a document; and sending the comment content to an instant messaging chat, and generating and displaying a corresponding preview of the comment content in the instant messaging chat.

16 Claims, 2 Drawing Sheets

User A
User A
User B
User C
. . .
User N
User A
Please send comments on the document to me.
X Product Instructions for Use
Comment content 1
Comment content 2
Read permission information v
Me
Send (S)

(56) References Cited

U.S. PATENT DOCUMENTS 9,880,985 B2 * 1/2018 Salazar .................. G06Q 50/01
10,466,882 B2 * 11/2019 Masterson .......... G06F 3/04847
10,503,835 B2 * 12/2019 Neff .................... G06F 16/9535
2005/0004986 A1 * 1/2005 Aoki ....................... G06F 9/543 709/206
2007/0118598 A1 * 5/2007 Bedi .................... G06Q 10/107 709/204
2011/0258526 A1 * 10/2011 Supakkul .............. G06F 40/169 715/230
2012/0278401 A1 * 11/2012 Meisels ................. G06F 40/169 709/206
2013/0174031 A1 * 7/2013 Constantinou .......... H04L 51/00 715/256
2013/0254699 A1 * 9/2013 Bashir ................... G06F 3/0481 715/772
2014/0298207 A1 * 10/2014 Ittah ....................... G06Q 10/00 715/753
2015/0195330 A1 * 7/2015 Lee ..................... H04L 67/5651 709/204
2016/0117289 A1 * 4/2016 Pan ....................... G06F 40/169 715/230
2017/0147547 A1 * 5/2017 Desai ...................... H04L 51/04
2018/0145934 A1 5/2018 Pappu et al.
2018/0165260 A1 * 6/2018 Soni ...................... G06F 40/197
2019/0034395 A1 * 1/2019 Curry .................... G06F 40/166
2019/0036853 A1 * 1/2019 Denoue ................ G06Q 10/101
2021/0141997 A1 * 5/2021 Pinnamaneni ...... G06F 16/9566
2023/0089889 A1 * 3/2023 Sun ....................... G06F 40/169 715/753
2023/0205905 A1 * 6/2023 Paul ........................ H04L 51/08
2023/0244848 A1 * 8/2023 Hahn .................... G06F 40/106 715/273
2023/0412653 A1 * 12/2023 Khurana ............. H04L 65/4025
2024/0039969 A1 * 2/2024 Jang ....................... H04L 65/403
2024/0163126 A1 * 5/2024 Clark .................. H04L 12/1822
2024/0184749 A1 * 6/2024 Qin ....................... G06F 3/0482

FOREIGN PATENT DOCUMENTS

CN 111240543 A 6/2020
CN 111325004 A 6/2020
CN 112256180 A 1/2021
CN 112422409 A 2/2021
CN 113254815 A 8/2021
CN 114565476 A 5/2022
CN 114697285 A 7/2022
CN 115373698 A 11/2022
CN 116244022 A 6/2023
JP 2016-184404 A 10/2016

OTHER PUBLICATIONS

Office Action for Japanese Patent Application No. 2025-518186, mailed on Sep. 2, 2025, 8 pages.
Office Action for Chinese Patent Application No. 202310097817.4, mailed on Apr. 15, 2026, 16 pages.

* cited by examiner

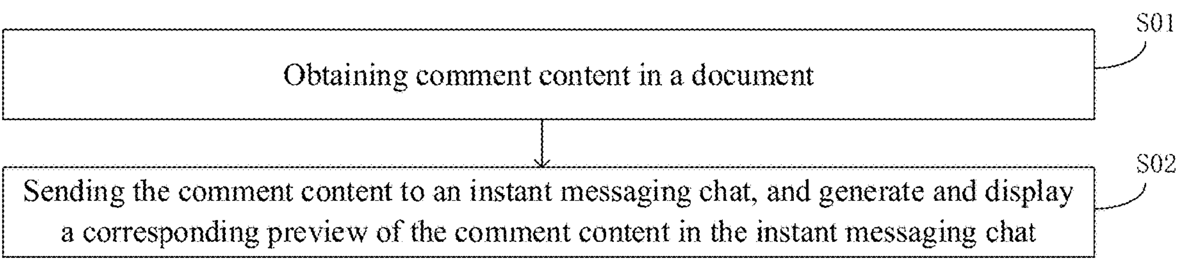
Fig. 1
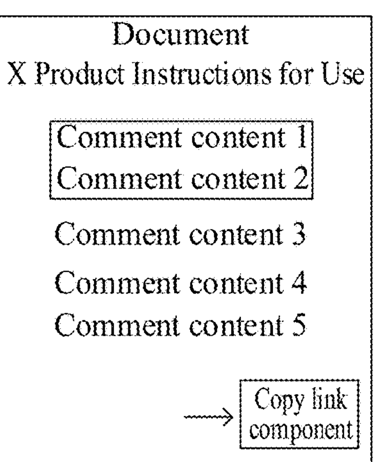
Fig. 2
User A
User A
User B
User C
. . .
User N
User A
Please send comments on the document to me.
X Product Instructions for Use
Send (S)
Fig. 3

COMMENT PROCESSING METHOD INVOLVING DISPLAYING PREVIEW OF COMMENT CONTENT IN INSTANT MESSAGING CHAT, ELECTRONIC DEVICE, AND STORAGE MEDIUM

CROSS-REFERENCE TO RELATED APPLICATION(S)

The present application is a continuation of International Patent Application No. PCT/CN2023/138166, filed on Dec. 12, 2023, which claims priority to and benefit of Chinese Patent Application No. 202310097817.4, filed on Jan. 30, 2023, the disclosures of the above applications are incorporated herein by reference as part of the present application in their entireties

TECHNICAL FIELD

Embodiments of the present disclosure relate to a comment processing method, an electronic device, and a storage medium.

BACKGROUND

When users need to share comment content in a document to instant messaging software, the users can only send a custom screenshot of the document or a link to the document, resulting in low efficiency of online collaboration and inconvenience for users to intuitively learn context information.

SUMMARY

The Summary is provided to give a brief overview of concepts, which will be described in detail later in the Detailed Description section. The Summary is neither intended to identify key or necessary features of the claimed technical solutions, nor is it intended to be used to limit the scope of the claimed technical solutions.

The present disclosure provides a comment processing method and apparatus, an electronic device, and a storage medium.

The following technical solutions are used in the present disclosure.

In some embodiments, the present disclosure provides a comment processing method, including:

- obtaining comment content in a document; and
- sending the comment content to an instant messaging chat, and generating and displaying a corresponding preview of the comment content in the instant messaging chat.

In some embodiments, the present disclosure provides a comment processing apparatus, including:

- a first processing module, configured to obtain comment content in a document; and
- a second processing module, configured to send the comment content to an instant messaging chat, and generate and display a corresponding preview of the comment content in the instant messaging chat.

In some embodiments, the present disclosure provides an electronic device, including: at least one memory and at least one processor, where the memory is configured to store program code, and the processor is configured to call the program code stored in the memory to perform the method described above.

In some embodiments, the present disclosure provides a computer-readable storage medium configured to store program code that, when executed by a processor, causes the processor to perform the method described above.

BRIEF DESCRIPTION OF DRAWINGS

The foregoing and other features, advantages, and aspects of embodiments of the present disclosure become more apparent with reference to the following specific implementations and in conjunction with the accompanying drawings. Throughout the accompanying drawings, the same or similar reference numerals denote the same or similar elements. It should be understood that the accompanying drawings are schematic and that parts and elements are not necessarily drawn to scale.

FIG. 1 is a flowchart of a comment processing method according to an embodiment of the present disclosure;

FIG. 2 is a schematic diagram of generating a copied link according to an embodiment of the present disclosure;

FIG. 3 is a first schematic diagram of forwarding a copied link according to an embodiment of the present disclosure;

DETAILED DESCRIPTION

Figure 4:
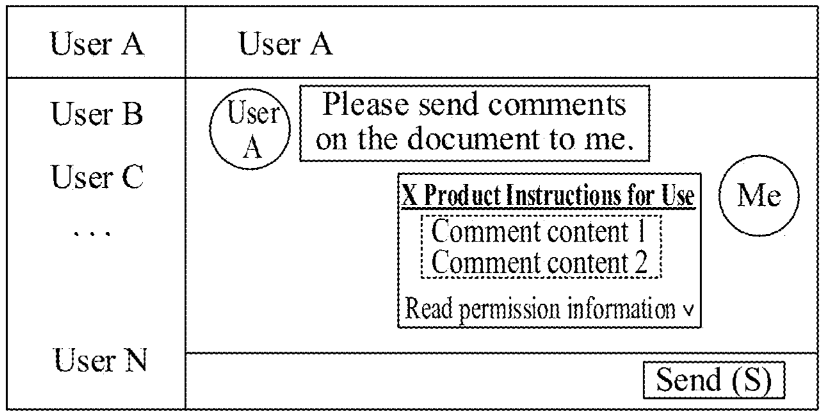
FIG. 4 is a second schematic diagram of forwarding a copied link according to an embodiment of the present disclosure.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below. The term "in response to" and a related term mean that a signal or event is affected by another signal or event to an extent, but is not necessarily fully or directly affected. If an event x occurs "in response to" an event y, x may respond directly or indirectly to y. For example, the occurrence of y may finally lead to the occurrence of x, but there may be other intermediate events and/or conditions. In other situations, the occurrence of y may not necessarily lead to the occurrence of x, that is, even if y has not occurred, x may occur. Moreover, the term "in response to" may also mean "at least partially in response to".

The term "determine" broadly encompasses a wide variety of actions, which may include obtaining, computing, calculating, processing, deriving, investigating, looking up (for example, looking up in a sheet, a database, or other data structures), ascertaining, or similar actions, and may further include receiving (for example, receiving information), accessing (for example, accessing data in a memory), or similar actions, and parsing, selecting, choosing, establishing, and similar actions, and the like. Related definitions of the other terms will be given in the description below. Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifier "one" mentioned in the present disclosure is illustrative and not restrictive, and those skilled in the art should understand that unless the context clearly indicates otherwise, the modifier should be understood as "one or more".

The names of messages or information exchanged between a plurality of apparatuses in the implementations of the present disclosure are used for illustrative purposes only, and are not used to limit the scope of these messages or information.

The solutions provided in the embodiments of the present disclosure are described in detail below with reference to the accompanying drawings.

As shown in FIG. 1, FIG. 1 is a flowchart of a comment processing method according to an embodiment of the present disclosure. The method includes the following steps.

Step S01: Obtaining comment content in a document.

Step S02: Sending the comment content to an instant messaging chat, and generating and displaying a corresponding preview of the comment content in the instant messaging chat.

In some embodiments, the method provided in the present disclosure allows a user to copy a link to selected comment content in the document, and is applicable to a PC (personal computer) end, a mobile end, and a world wide web end (hereinafter referred to as "web" end). As shown in FIG. 2, when the user triggers an operation of copying the link to the selected comment content in the document, a copied link to the selected comment content is generated.

In some embodiments, as shown in FIG. 3, it is allowed to paste the copied link to an input box of instant messaging software (instant messenger, IM). When the user triggers sending the copied link, the copied link is parsed, and a corresponding message preview is generated. For example, the IM may obtain a message card by parsing the copied link.

In some embodiments, the message preview obtained by parsing is displayed in a chat window, and a user in the chat may preview and forward the preview message.

In some embodiments, as shown in FIG. 3, a document link is included in the message preview, allowing to click on the document link to open the document and quickly locate the comment. For example, clicking on "X Product Instructions for Use" in the message preview may quickly open an "X Product Instructions for Use" document and jump to a comment position.

In the comment processing method provided in this embodiment of the present disclosure, the comment content in the document is obtained; the comment content is sent to the instant messaging chat, and the corresponding preview of the comment content is generated and displayed in the instant messaging chat. The method provided in this embodiment of the present disclosure enables forwarding the comment content in the document to the instant messaging chat and generating the corresponding message preview, making it easy for the user to receive the message in the chat window, and improving the efficiency of online collaboration.

In some embodiments, the sending the comment content to an instant messaging chat includes:

sending the comment content to the instant messaging chat in response to a copy-and-paste link operation on the comment content.

In some embodiments, the sending the comment content to an instant messaging chat includes:

sending the comment content to the instant messaging chat in response to a forward operation on the comment content.

In some embodiments, in addition to copying the link, the mobile end also supports directly forwarding the selected comment content in the document, after which the IM parses the comment content to generate the message preview. For example, after the user selects the comment content in the document and triggers a one-click forward component, the IM parses the comment content and generates and displays the message preview in the target chat window. The mobile end includes mobile devices such as a mobile phone, a tablet computer, etc.

In some embodiments, comments allowed to be sent include a comment on selected text, a comment on full text, an emoji comment on a content block, etc. At the web end, a copy link component is included, and the copied link to the comment content allowed to be sent may be generated by triggering the copy link component.

In some embodiments, the mobile end includes both the copy link component and a send-to-chat component. The copied link to the comment content allowed to be sent may be generated by triggering the copy link component, and the copied link to the comment content allowed to be sent may be forwarded to the target chat window with one click by triggering the send-to-chat component.

In some embodiments, an account for the document and an instant messaging account are accounts set up by the same user in an application suite.

In some embodiments, the preview includes the comment content and body content in the document corresponding to the comment content.

In some embodiments, the sending the comment content to the instant messaging chat in response to a copy-and-paste link operation on the comment content includes:

generating a copied link to the comment content in response to a copy link operation on the comment content; and sending the comment content to the instant messaging chat in response to a forward operation on the copied link.

In some embodiments, the method further includes:

obtaining, in response to the forward operation on the comment content, an instant messaging account that matches an account for the document, and displaying an instant messaging interface corresponding to the instant messaging account; and sending, in response to a trigger operation on a target chat in the instant messaging interface, the comment content to the target chat.

In some embodiments, when the comment content is forwarded, if a document application and an instant messaging application are both sub-applications of the same application, or the document application and the instant messaging application are logged in via an account of the same user, then the instant messaging interface corresponding to the instant messaging account may be directly displayed; and the comment content is sent to the target chat in response to the trigger operation on the target chat in the instant messaging interface.

In some embodiments, the preview includes a document link to the document; and in response to a trigger operation on the document link, the document is displayed and a position of the comment content is jumped to.

In some embodiments, the information to be forwarded includes the comment content in the document, the comment content includes an emoji comment, and the emoji comment is a reply of a user to a regular comment in the document. The emoji comment is directly added in a region of an existing regular comment, rather than directly generating another regular comment. The emoji comment and the regular comment are different types of comments.

In some embodiments, when the comment content in the document changes, the comment content that has been sent to the instant messaging chat will be updated accordingly. For example, in response to that a new comment entry is added to or a comment entry is deleted from the comment content in the document, the preview of the comment content in the instant messaging chat will be added or deleted accordingly; in response to that the comment content in the document is hidden or resolved, the preview of the comment content in the instant messaging chat will be displayed as preset prompt information, such as "This comment cannot be viewed or this comment does not exist." If the document content corresponding to the comment in the document changes, the document content in the preview of the comment content in the instant messaging chat will change accordingly.

In some embodiments, the present disclosure enables the user to send the comment content and the emoji reply content in the document to the chat, helping the user better share the comment content, and allows to copy web-end comment content as a link, making it easy for the user to paste and send the link to the chat. Furthermore, the change and status of the forwarded content are coordinated, making it easy for a user to receive the message in the chat and improving the efficiency of information transfer.

In some embodiments, the preview includes a document link to the document; and in response to a trigger operation on the document link, the document is displayed and a position of the comment content is jumped to.

In some embodiments, clicking on "Copy link" pops up a toast at the top of the page body to prompt the user of an operation result, including: Copy successful, or Copy failed, and please try again.

In some embodiments, after the "send-to-chat" component is clicked on at the mobile end, a share panel is called, which includes selecting/searching and selecting a user or group to be shared to. After the selected user/group is clicked on, the interface prompts that the link is to be sent, and a message may be left. Further, when "Send" is clicked on, the link may be shared to the chat, and when "Cancel" is clicked on, the sending of the comment may be canceled.

In some embodiments, the preview includes user permission information; read permission information is displayed at a preset position of the preview in response to that a user has a read permission for the document; edit permission information is displayed at a preset position of the preview in response to that the user has an edit permission for the document; and manage permission information is displayed at a preset position of the preview in response to that the user has a manage permission for the document.

In some embodiments, the message preview (message card) is generated when the comment is sent to the instant messaging chat, prompting the user of specific permissions, and supporting permission settings, opening, etc.

In some embodiments, the message card may be forwarded by any user, but a recipient needs to have a document read permission to view the preview.

In some embodiments, when a user has a permission to share the document, the user will be automatically authorized when sending a comment (aligning with sharing the document link), and whether document authorization may be shared aligns with permission logic of the user in the document.

In some embodiments, when the user does not have the permission to share the document, the user is prompted on the message card of no permission after sending the comment, but a forwarder may request permissions on behalf of a recipient.

In some embodiments, in response to that a user in the chat has a read permission for the document, the bottom of the document message card shows: You can view it.

In some embodiments, in response to that the user in the chat has an edit permission for the document, the bottom of the document message card shows: You can edit it.

In some embodiments, in response to that the user in the chat does not have the read permission for the document, a bottom line graphic of no permission is shown.

In some embodiments, in response to that the user in the chat has a manage permission for the document, the bottom of the document card shows: one-on-one chat: <user_name> can view the document and can further edit authorization permissions: viewable, editable; or group chat: <members of this group> can view the document and can further edit the authorization permissions: viewable, editable.

In some embodiments, when the user does not have the permission to share the document, the user is prompted on the message card of no permission after sending the comment, but a forwarder may request permissions on behalf of a recipient.

In some embodiments, the preview includes at least one of a user avatar, a user identifier, a comment editing status, a comment time, and an emoji reaction to the comment.

In some embodiments, the parsing the copied link and generating a message preview includes: parsing the copied link, and dynamically obtaining a snapshot of the information to be forwarded in the document; and dynamically generating the message preview based on the snapshot.

In some embodiments, the forwarded comment content is a preview of the comment content, which is a snapshot on the IM, aligning with presentation of sharing the document link. The content of the preview includes the content of the comment card selected by the user.

In some embodiments, the forwarded comment content is dynamic content, which is updated as the content of the original document is updated, such as comment being edited, comment being deleted, original text being deleted, etc., and is also changes depending on permissions of the user for the document.

In some embodiments, a document title is displayed on the message card, together with an anchor link to the comment in the document.

In some embodiments, the parsing the copied link further includes: parsing the copied link into a document title of the document, and displaying the document title in an input box of the chat window.

In some embodiments, the link is parsed into the document title in the input box and the message preview, aligning with parsed text of the shared document.

In some embodiments, the message preview includes at least one of a user avatar, a user identifier, a citation, the comment content, and a comment time corresponding to the information to be forwarded.

In some embodiments, a message style rendered in the IM includes the following: Description section: xxx (rendered document title, which is a clickable anchor link, such as the "X Product Instructions for Use" in FIG. 4). Content section: a snapshot of the full comment content, with a style as aligned as possible with a comment panel for easy understanding, including the avatar, the user name, the citation, the comment content, the comment time, the emoji reply to the comment, a picture, etc.

In some embodiments, a rendering rule for the comment card includes: determining two heights: a minimum card height and a maximum card height. The minimum card height is adaptive to a single comment. The maximum card height is not specifically limited herein, and reference may be made to actual specifications for the web end, the mobile end, and the PC end.

In some embodiments, when the comment card exceeds the maximum card height, the snapshot portion will be directly truncated and a fade effect will be added.

In some embodiments, an emoji reply may be added to the message card after the comment content is forwarded to the IM, and replying, forwarding, generating a topic, and other operations may be performed on the message card.

In some embodiments, the present disclosure addresses the issue that is frequently fed back by users, improving the efficiency of message transfer across web pages and client conversations, and also addresses the issue of coordination when a message changes across multiple ends. The embodiments of the present disclosure are compatible with message transfer across the PC end, the web end, and the mobile end.

An embodiment of the present disclosure further provides a comment processing apparatus. The apparatus includes:

- a first processing module, configured to obtain comment content in a document; and
- a second processing module, configured to send the comment content to an instant messaging chat, and generate and display a corresponding preview of the comment content in the instant messaging chat.

In some embodiments, the second processing module is specifically configured to: send the comment content to the instant messaging chat in response to a copy-and-paste link operation on the comment content.

In some embodiments, the second processing module is specifically configured to: send the comment content to the instant messaging chat in response to a forward operation on the comment content.

In some embodiments, an account for the document and an instant messaging account are accounts set up by the same user in an application suite.

In some embodiments, the preview includes the comment content and body content in the document corresponding to the comment content.

In some embodiments, the second processing module is specifically configured to:

- generate a copied link to the comment content in response to a copy link operation on the comment content; and
- send the comment content to the instant messaging chat in response to a forward operation on the copied link.

In some embodiments, the second processing module is further specifically configured to: obtain, in response to the forward operation on the comment content, an instant messaging account that matches an account for the document, and display an instant messaging interface corresponding to the instant messaging account; and

- send, in response to a trigger operation on a target chat in the instant messaging interface, the comment content to the target chat.

In some embodiments, the preview includes a document link to the document; and the second processing module is further specifically configured to: in response to a trigger operation on the document link, display the document and jump to a position of the comment content.

In some embodiments, the second processing module is further specifically configured to: display copy result prompt information at a preset position of the document.

In some embodiments, the preview includes user permission information;

- the second processing module is further specifically configured to: display read permission information at a preset position of the preview if a user has a read permission for the document; display edit permission information at a preset position of the preview if the user has an edit permission for the document; and display manage permission information at a preset position of the preview if the user has a manage permission for the document.

In some embodiments, the preview includes at least one of a user avatar, a user identifier, a comment editing status, a comment time, and an emoji reaction to the comment.

The apparatus embodiment substantially corresponds to the method embodiment, and therefore for a related part, reference may be made to the descriptions of the part in the method embodiment. The apparatus embodiment described above is merely illustrative. The modules illustrated as separate modules may be or may not be separate. Some or all of the modules may be selected according to actual needs to achieve the objectives of the solutions of the embodiments. which can be understood and implemented by those of ordinary skill in the art without involving any inventive effort.

The method and apparatus of the present disclosure have been described above based on the embodiments and application cases. In addition, the present disclosure further provides an electronic device and a computer-readable storage medium. The electronic device and the computer-readable storage medium are described below.

Figure 5:
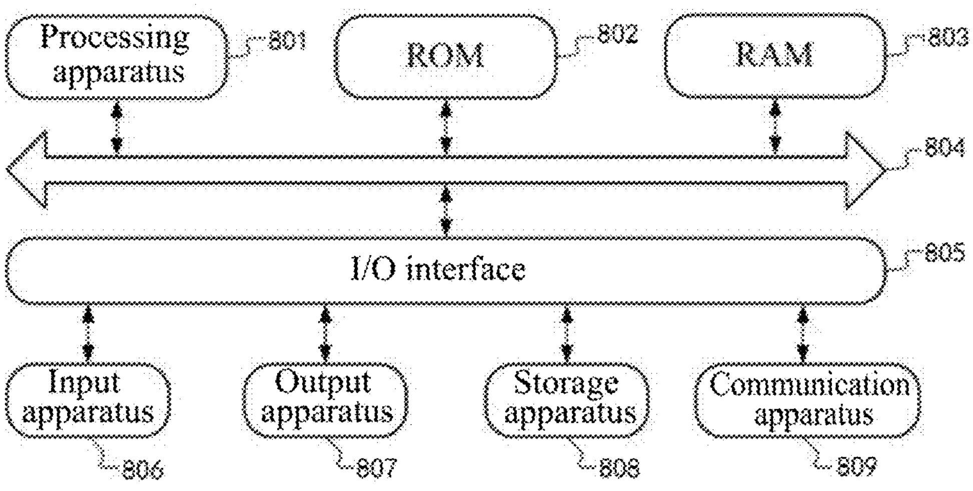
FIG. 5 is a schematic diagram of a structure of an electronic device according to an embodiment of the present disclosure.

Referring to FIG. 5 below, there is shown a schematic diagram of a structure of an electronic device (such as a terminal device or a server) 800 suitable for implementing an embodiment of the present disclosure. The terminal device in this embodiment of the present disclosure may include, but is not limited to, a mobile terminal such as a mobile phone, a notebook computer, a digital broadcast receiver, a personal digital assistant (PDA), a tablet computer (PAD), a portable multimedia player (PMP), or a vehicle-mounted terminal (e.g., a vehicle navigation terminal), and a fixed terminal such as a digital TV or a desktop computer. The electronic device shown in the figure is merely an example, and shall not impose any limitation on the function and scope of use of the embodiments of the present disclosure.

The electronic device 800 may include a processing apparatus (e.g., a central processing unit, a graphics processing unit, etc.) 801 that may perform a variety of appropriate actions and processing in accordance with a program stored in a read-only memory (ROM) 802 or a program loaded from a storage apparatus 808 into a random-access memory (RAM) 803. The RAM 803 further stores various programs and data required for operations of the electronic device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 including, for example, a touchscreen, a touchpad, a keyboard, a mouse, a camera, a microphone, an accelerometer, and a gyroscope; an output apparatus 807 including, for example, a liquid crystal display (LCD), a speaker, and a vibrator; the storage apparatus 808 including, for example, a tape and a hard disk; and a communication apparatus 809. The communication apparatus 809 may allow the electronic device 800 to perform wireless or wired communication with other devices to exchange data. Although the figure shows the electronic device 800 having various apparatuses, it should be understood that it is not required to implement or have all of the shown apparatuses. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a computer-readable medium, where the computer program includes program code for performing the method shown in the flowchart. In such an embodiment, the computer program may be downloaded from a network through the communication apparatus 809 and installed, installed from the storage apparatus 808, or installed from the ROM 802. When the computer program is executed by the processing apparatus 801, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM) (or a flash memory), an optical fiber, a portable compact disc read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may further be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server may communicate using any currently known or future-developed network protocol such as the Hypertext Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs, and the one or more programs, when executed by the electronic device, cause the electronic device to perform the above method according to the present disclosure.

The computer program code for performing the operations in the present disclosure may be written in one or more programming languages or a combination thereof, where the programming languages include an object-oriented programming language, such as Java, Smalltalk, or C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowchart and block diagram in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. The name of a unit does not constitute a limitation on the unit itself under certain circumstances.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM) (or a flash memory), an optic fiber, a portable compact disc read-only memory (CD-ROM), an optical storage device, a magnetic storage device, or any suitable combination thereof.

According to one or more embodiments of the present disclosure, a comment processing method is provided, including:

obtaining comment content in a document; and sending the comment content to an instant messaging chat, and generating and displaying a corresponding preview of the comment content in the instant messaging chat.

According to one or more embodiments of the present disclosure, the method is provided, where the sending the comment content to an instant messaging chat includes: sending the comment content to the instant messaging chat in response to a copy-and-paste link operation on the comment content.

According to one or more embodiments of the present disclosure, the method is provided, where the sending the comment content to an instant messaging chat includes:

sending the comment content to the instant messaging chat in response to a forward operation on the comment content.

According to one or more embodiments of the present disclosure, the method is provided, where an account for the document and an instant messaging account are accounts set up by the same user in an application suite.

According to one or more embodiments of the present disclosure, the method is provided, where the preview includes the comment content and body content in the document corresponding to the comment content.

According to one or more embodiments of the present disclosure, the method is provided, where the sending the comment content to the instant messaging chat in response to a copy-and-paste link operation on the comment content includes:

generating a copied link to the comment content in response to a copy link operation on the comment content; and sending the comment content to the instant messaging chat in response to a forward operation on the copied link.

According to one or more embodiments of the present disclosure, the method is provided, further including:

obtaining, in response to the forward operation on the comment content, an instant messaging account that matches an account for the document, and displaying an instant messaging interface corresponding to the instant messaging account; and sending, in response to a trigger operation on a target chat in the instant messaging interface, the comment content to the target chat.

According to one or more embodiments of the present disclosure, the method is provided, where the preview includes a document link to the document; and in response to a trigger operation on the document link, the document is displayed and a position of the comment content is jumped to.

According to one or more embodiments of the present disclosure, the method is provided, where after the generating a copied link to the comment content, the method further includes:

displaying copy result prompt information at a preset position of the document.

According to one or more embodiments of the present disclosure, the method is provided, where the preview includes user permission information;

read permission information is displayed at a preset position of the preview in response to that a user has a read permission for the document;

edit permission information is displayed at a preset position of the preview in response to that the user has an edit permission for the document; and manage permission information is displayed at a preset position of the preview in response to that the user has a manage permission for the document.

According to one or more embodiments of the present disclosure, the method is provided, where the preview includes at least one of a user avatar, a user identifier, a comment editing status, a comment time, and an emoji reaction to the comment.

According to one or more embodiments of the present disclosure, a comment processing apparatus is provided, including:

a first processing module, configured to obtain comment content in a document; and a second processing module, configured to send the comment content to an instant messaging chat, and generate and display a corresponding preview of the comment content in the instant messaging chat.

According to one or more embodiments of the present disclosure, an electronic device is provided, including at least one memory and at least one processor, where the at least one memory is configured to store program code, and the at least one processor is configured to call the program code stored in the at least one memory to perform any one of the methods described above.

According to one or more embodiments of the present disclosure, a computer-readable storage medium is provided, which is configured to store program code that, when executed by a processor, causes the processor to perform the method described above.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A comment processing method, comprising:

in response to a selection operation triggered by a send user, obtaining comment content that is selected in a document; and sending the comment content to an instant messaging chat, and generating and displaying a message card corresponding to the comment content in the instant messaging chat in a form of a chat message, wherein the chat message is sent on behalf of the send user, the message card prompts a user of user permission information, the message card is forwardable, and a preview of the comment content corresponding to the message card is seen by only a recipient who has a document read permission, and the preview of the comment content corresponding to the message card comprises an avatar of a comment user which generates the comment content and an identifier of the comment user, wherein the sending the comment content to an instant messaging chat comprises:

sending the comment content to the instant messaging chat in response to a forward operation triggered by the user on the comment content, or sending the comment content to the instant messaging chat in response to a copy-and-paste link operation triggered by the user on the comment content.

2. The method according to claim 1, wherein the sending the comment content to an instant messaging chat comprises:

sending a link to the comment content to the instant messaging chat in the form of the chat message.

3. The method according to claim 1, wherein an account for the document and an instant messaging account are accounts set up by the same user in an application suite.

4. The method according to claim 1, wherein the preview comprises the comment content and body content in the document corresponding to the comment content.

5. The method according to claim 1, wherein the sending the comment content to the instant messaging chat in response to a copy-and-paste link operation on the comment content further comprises:

generating a copied link to the comment content in response to a copy link operation on the comment content; and sending the comment content to the instant messaging chat in response to a forward operation on the copied link.

6. The method according to claim 1, further comprising:

obtaining, in response to the forward operation on the comment content, an instant messaging account that matches an account for the document, and displaying an instant messaging interface corresponding to the instant messaging account; and sending, in response to a trigger operation on a target chat in the instant messaging interface, the comment content to the target chat.

7. The method according to claim 1, wherein the preview comprises a document link to the document; and in response to a trigger operation on the document link, the document is displayed and a position of the comment content is jumped to.

8. The method according to claim 5, wherein after the generating a copied link to the comment content, the method further comprises:

displaying copy result prompt information at a preset position of the document.

9. The method according to claim 1, wherein read permission information is displayed at a preset position of the message card in response to that a user has a read permission for the document;

edit permission information is displayed at a preset position of the message card in response to that the user has an edit permission for the document; and manage permission information is displayed at a preset position of the message card in response to that the user has a manage permission for the document.

10. The method according to claim 1, wherein the preview further comprises at least one of a comment editing status, a comment time, or an emoji reaction to the comment.

11. The method according to claim 2, wherein an account for the document and an instant messaging account are accounts set up by the same user in an application suite.

12. The method according to claim 2, wherein the preview comprises the comment content and body content in the document corresponding to the comment content.

13. The method according to claim 3, wherein the preview comprises the comment content and body content in the document corresponding to the comment content.

14. The method according to claim 2, wherein the preview comprises a document link to the document; and in response to a trigger operation on the document link, the document is displayed and a position of the comment content is jumped to.

15. An electronic device, comprising:

at least one memory and at least one processor, wherein the at least one memory is configured to store program code, and the at least one processor is configured to call the program code stored in the at least one memory to perform a comment processing method, wherein the comment processing method comprises:

in response to a selection operation triggered by a send user, obtaining comment content that is selected in a document; and sending the comment content to an instant messaging chat, and generating and displaying a message card corresponding to the comment content in the instant messaging chat in a form of a chat message, the chat message is sent on behalf of the send user, the message card prompts a user of user permission information, the message card is forwardable, and a preview of the comment content corresponding to the message card is seen by only a recipient who has a document read permission, and the preview of the comment content corresponding to the message card comprises an avatar of a comment user which generates the comment content and an identifier of the comment user, wherein the sending the comment content to an instant messaging chat comprises:

sending the comment content to the instant messaging chat in response to a forward operation triggered by the user on the comment content, or sending the comment content to the instant messaging chat in response to a copy-and-paste link operation triggered by the user on the comment content.

16. A non-transitory computer-readable storage medium, configured to store program code that, when executed by a computer device, causes the computer device to perform a comment processing method, wherein the comment processing method comprises:

in response to a selection operation triggered by a send user, obtaining comment content that is selected in a document; and sending the comment content to an instant messaging chat, and generating and displaying a message card corresponding to the comment content in the instant messaging chat in a form of a chat message, wherein the chat message is sent on behalf of the send user, the message card prompts a user of user permission information, the message card is forwardable, and a preview of the comment content corresponding to the message card is seen by only a recipient who has a document read permission, and the preview of the comment content corresponding to the message card comprises an avatar of a comment user which generates the comment content and an identifier of the comment user, wherein the sending the comment content to an instant messaging chat comprises:

sending the comment content to the instant messaging chat in response to a forward operation triggered by the user on the comment content, or sending the comment content to the instant messaging chat in response to a copy-and-paste link operation triggered by the user on the comment content.

* * * * *